United States Patent
Seltzer

[15] 3,693,448
[45] Sept. 26, 1972

[54] INDICATING DEVICE FOR ENGINES

[72] Inventor: Harry Seltzer, East Meadow, N.Y.

[73] Assignee: Lee Myles Corp., Maspeth, N.Y.

[22] Filed: Oct. 12, 1970

[21] Appl. No.: 80,210

Related U.S. Application Data

[63] Continuation of Ser. No. 726,683, May 6, 1968, abandoned.

[52] U.S. Cl. ................73/344, 33/126.7 R, 73/358
[51] Int. Cl. .....................G01k 11/08, G01f 23/04
[58] Field of Search ........73/356, 358, 344; 116/114, 116/114.5, 114.20, 114.22, 114.27; 33/126.7

[56] References Cited

UNITED STATES PATENTS 3,054,378    9/1962    Bienfait ..................116/114.5

FOREIGN PATENTS OR APPLICATIONS 506,550    5/1939    Great Britain ...............73/356

*Primary Examiner*—Louis R. Prince
*Attorney*—Yuter & Fields

[57] ABSTRACT

An oil temperature indicating device which comprises an oil temperature indicating means adapted to undergo a detectable physical change when subjected to an oil operating temperature at or above a pre-determined temperature, and a mounting means therefor adapted to dispose said oil temperature indicating means within a mass of oil under operating conditions, whereby operation of the oil at or above the pre-determined temperature can be detected by a change caused thereby in the oil temperature indicating means.

3 Claims, 5 Drawing Figures

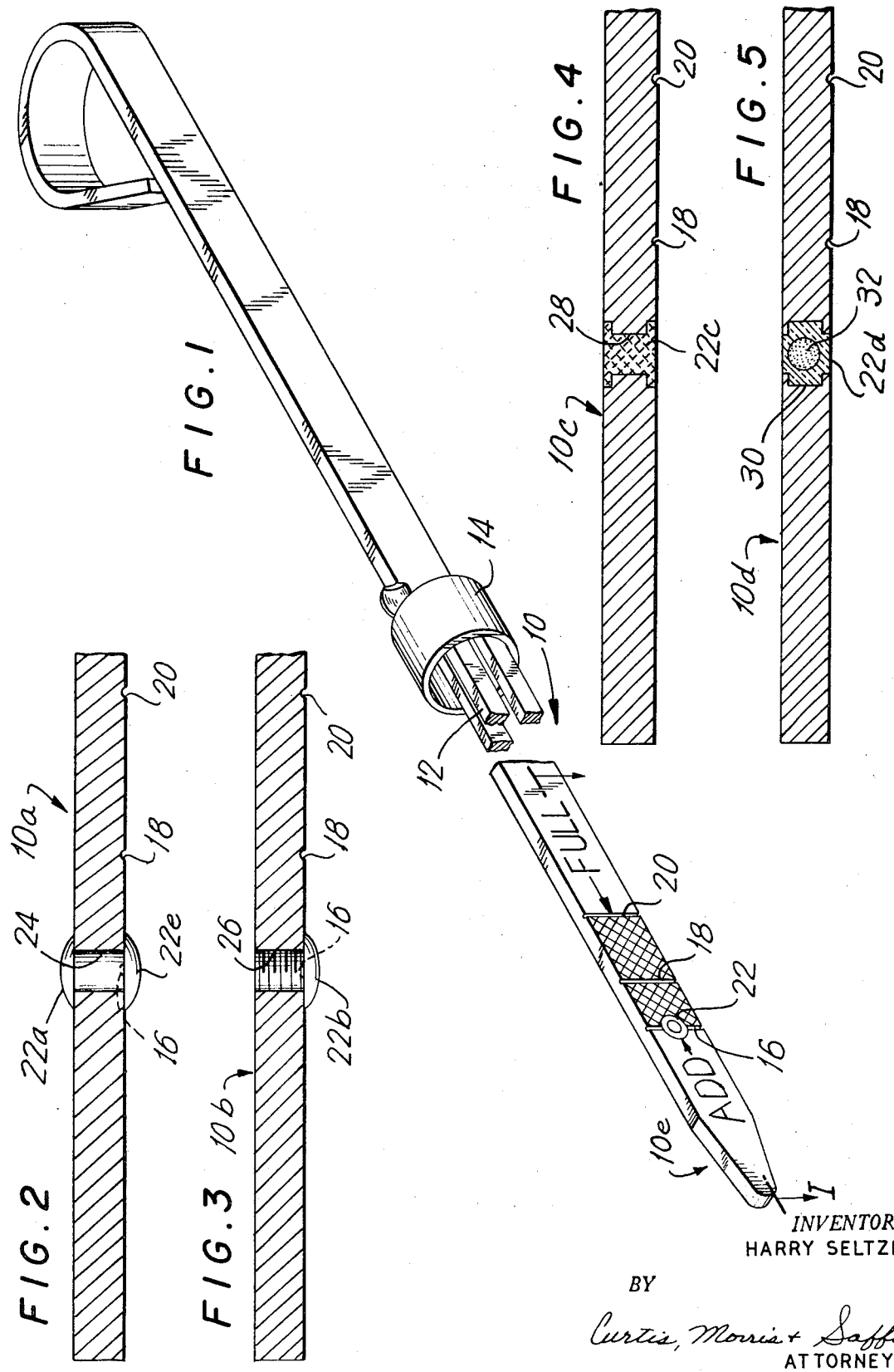

INDICATING DEVICE FOR ENGINES

This is a continuation of application Ser. No. 726,683, filed May 6, 1968, now abandoned.

This invention relates to a device that indicates operating conditions in engines and transmissions, and more particularly to a device capable of warning a motorist or mechanic that the operating temperature of the oil in an engine crankcase or a transmission has reached a level at which serious degradation of the oil therein rapidly occurs.

It is well known that oil in engines and transmissions, particularly in motor vehicles, degrades during usage and must be changed periodically for continued good operation and to avoid mechanical damage to engine and transmission parts. The length of time during which the oil in an engine or a transmission provides satisfactory service varies widely, of course, depending generally upon the design of the machine, the operating conditions such as ambient temperature, altitude, stop-and-go traffic, dusty roads and towing trailers, and the quality of the oil itself. Ultimately the oil deteriorates, forming sludges, varnishes and other organic products that cause loss of the important physical properties desirable in a good lubricant. Degradation is brought on chiefly by oxidation, which is promoted by mechanical churning of the oil during operation, and temperature which promotes the adverse chemical and physical changes that occur in the oil. It has been found that an increase of about 17° or 18° F. in he operational temperature of the oil approximately doubles its rate of oxidation, with a corresponding reduction of useful service life, e.g., mileage. Griffen, "Temperature Effect on Transmission Operation," S.A.E. Paper 545C, June 1962, p. 6; Freedgood et al., "Keeping Pace With Automatic Transmission Fluids Technology," Enjay Additives Laboratory publication, Ref. No. 6705-4971, 1967, p. 8. In such circumstances it is helpful for a motorist or mechanic to know whether the oil in an engine or transmission has been or is being subjected to operation at an inordinately high temperature such that rapid degradation of the oil has taken place or is occuring, and thus to know that the oil needs replacement immediately or sooner than normally expected.

Mechanical defects or malfunctions in engines or transmissions also can cause the oil temperature to rise above normal values. For example, a faulty oil pump or a varnish-clogged oil pump filter or screen will impair the flow of oil and thereby raise the oil temperature. Similarly, excess friction between worn parts might increase the oil operating temperature. A device to indicate the high oil temperature, and thus to suggest possible trouble, also helps a motorist or mechanic in this regard.

Accordingly it is an object of this invention to provide a device for checking engine and transmission oil operating temperature. It is also an object of the invention to provide a readily available and inexpensive device to indicate oil temperatures in engines and transmissions, particularly in motor vehicles, at which untoward degradation of the oil rapidly occurs. A further object of the invention is to provide such an oil temperature indicating device that warns of possible mechanical malfunction in the engine or transmission. These and other objects of the invention will be in part discussed in and in part apparent from the more detailed disclosure of the invention hereinafter.

An understanding of the invention is facilitated by reference to the accompanying drawings in which:

FIG. 1 is a perspective and shows an oil dipstick having an indicating means according to the invention; and FIGS. 2, 3, 4 and 5 are partial sections taken along the line I—I of FIG. 1 and show different embodiments of the indicating means mounted in the dipstick.

FIG. 1 shows a dipstick 10 of the type generally used in engines and transmissions to show the level, and thus the amount, of oil therein. The dipstick has means 12 to hold it firmly in a sleeve in the engine block or transmission casing that directs the dipstick into the oil sump, and a covering 14 for the sleeve. Toward the end 10e of the dipstick that is inserted into the engine crankcase or transmission sump are scored lines to indicate whether oil is to be added 16, the quantity of oil is normal 18 or the crankcase or sump contains the maximum desirable amount 20 of oil. Mounted in the dipstick is an oil temperature indicating means 22, preferably at or below the line 16 that shows the minimum amount of oil for safe operation. Thus the oil temperature indicating means 22 always will be in the oil of the crankcase or transmission case.

The oil temperature indicating means 22 can be mounted onto the dipstick in any suitable manner, as will be readily apparent to persons skilled in mechanical designs. FIGS. 2, 3, 4 and 5 illustrate several ways to accomplish the mounting.

FIG. 2 shows a dipstick 10a having a hole 24 drilled therethrough, and an oil temperature indicating means 22a through the hole. The indicating means 22a is peened over to form, in effect, a rivet. FIG. 3 shows a dipstick 10b having a tapped hole 26 into which an oil temperature indicating means 22b is screwed. FIGS. 4 and 5 show dipsticks 10c and 10d having openings 28, 30 of different configurations into which oil temperature indicating means 22c, 22d are fitted, the particular configuration of the openings 28, 30 and the indicating means 22c, 22d forming a mechanical lock. Of course, the indicating means simply can be press-fit into an opening, e.g., 24, in the dipstick, and the opening therein need not be completely through the dipstick.

Suitable materials for the oil temperature indicating means 22 include a variety of substances. The criterion for them is that the indicating means is changed physically at or above a pre-determined temperature. For example, the indicating means 22 can be made of a metal or a metallic alloy that has a melting temperature at or about the pre-determined temperature. Thus if that temperature is reached or exceeded, the indicating means will melt and run out of the dipstick. Its absence therefrom, of course, will be noticed immediately by a motorist, mechanic or service station attendant at the next stop for fuel. Similarly, an indicating means can be made of a resinous material having a melting point at or about the pre-determined temperature. Any metal or resin released by heat from the dipstick will be trapped at the filter or screen in front of the oil pump.

Numerous metal alloys are suitable as the indicating means. Generally such alloys are mixtures of bismuth, lead and tin, or combinations thereof. Some commercially available alloys include: "Cerrobase" 05742-3, Bi 57.42 percent, Pb 1.00 percent, Sn 41.58 percent, melt point 275°F.; "Cerrotru," Bi 58.00 percent, Sn 42.00 percent, melt point 281°F.; "Cerrocast" 4001, Bi 4.00 percent, Pb 55.50 percent, Sn 40.50 percent, melting range 338°–388° F., yield point 343° F.; "Cerrobase," Bi 55.50 percent, Pb 44.50 percent, melt point 255° F.; available from Cerro Corporation. An example of one of the many types of suitable synthetic resins is "Elvax," Grado 220, a vinyl resin made by DuPont.

An oil temperature indicating means 22 that does not leave the dipstick also can be constructed, provided that a noticeable change occurs to the indicating means if the pre-determined temperature is reached or exceeded. For example, a physical change resulting from a chemical change, or reaction, such as a color change of the material, can be utilized. A suitable resin or a heat-sensitive dye or pigment can be used to effect that purpose. Such a dye or pigment, which changes color at or about the pre-determined temperature, can be blended into a resinous material to form the indicating means, or can be encapsulated 32 into a transparent or translucent medium 22d, such as a resin.

A spot of colored paint, which is insensitive to heat in the range of the pre-determined temperature, can also be placed on the dipstick, for example in a recess therein at or adjacent the scored line 16, or on the head 22e of a rivet 22 made of steel, and covered with an alloy or resin described above. When the alloy or resin covering melts, due to oil temperature at about the pre-determined value, the exposed colored paint readily can be seen.

It will be apparent that means other than a dipstick can be utilized to dispose the oil temperature indicating means within the mass of oil in an engine or transmission during the operation thereof.

The pre-determined temperature at which a detectable change occurs in the oil temperature indicating means will depend upon the particular designed oil operating temperature of the engine or transmission, the kind of usual operating conditions of the vehicle or power plant, and the particular oil recommended or actually used therein. In general the pre-determined temperature should be about 25° to about 75° F. above the designed or expected normal operating oil temperature. In some vehicles, for example taxicabs, the predetermined temperature might be even higher to account for the more severe type of service of the vehicles and the generally higher oil operating temperature therein. Borden et al., "Field and Laboratory Evaluations of Automatic Transmission Fluids," S.A.E. Paper No. 660099, January 1966. The pre-determined temperature at which the oil temperature indicating means is designed to be affected generally is in the range of about 250° F. to about 300° F.

It is to be understood that numerous changes can be made in the construction, materials and mode of operational parameters of the device of this invention without departing from the scope thereof.

I claim:

1. An oil temperature sensing device comprising a dipstick adapted to be inserted into the oil in an engine and having at its dipped end indicia for indicating whether or not additional oil should be added, an opening in said dipstick positioned between the dipped end of the dipstick and the indicia indicating that oil should be added, and a temperature sensing means having a melting point below a predetermined temperature mounted in said opening in said dipstick and adapted to melt at or above said predetermined temperature to reopen said opening and provide an indication that said predetermined temperature has been reached or exceeded.

2. A temperature sensing device for sensing the temperature of a fluid mass comprising a mounting means adapted to be inserted into the fluid mass whose temperature is to be sensed, an opening in said mounting means, and a temperature sensing means positioned in said opening and adapted to melt when subject to a temperature at or above a predetermined temperature, the melting providing a positive indication that the predetermined temperature has been reached or exceeded, said temperature sensing means comprising a body adapted to be inserted into said opening and a head affixed to one end of said body, said mounting means having an indicia near that end of the mounting means which is inserted into the fluid which indicates that more fluid should be added, and said opening in which said temperature sensing means is positioned is between said indicia and said end of the mounting means.

3. A fluid temperature sensing device comprising an elongated member having one end adapted to be inserted into the fluid in an internal combustion engine, receiving means on said member having at least one open end and positioned to contact said fluid when said member is inserted into the fluid for receiving temperature sensing means therein, and meltable temperature sensing means having a melting point substantially at a predetermined temperature in said receiving means and positioned to be in direct engagement with said fluid when said member is inserted into said fluid, said sensing means melting at said predetermined temperature to flow out of said open end of said receiving means to indicate that said predetermined temperature has been reached or exceeded.

* * * * *